(No Model.)
H. E. PRIDMORE.
HARVESTER REEL.
No. 270,910. Patented Jan. 23, 1883.
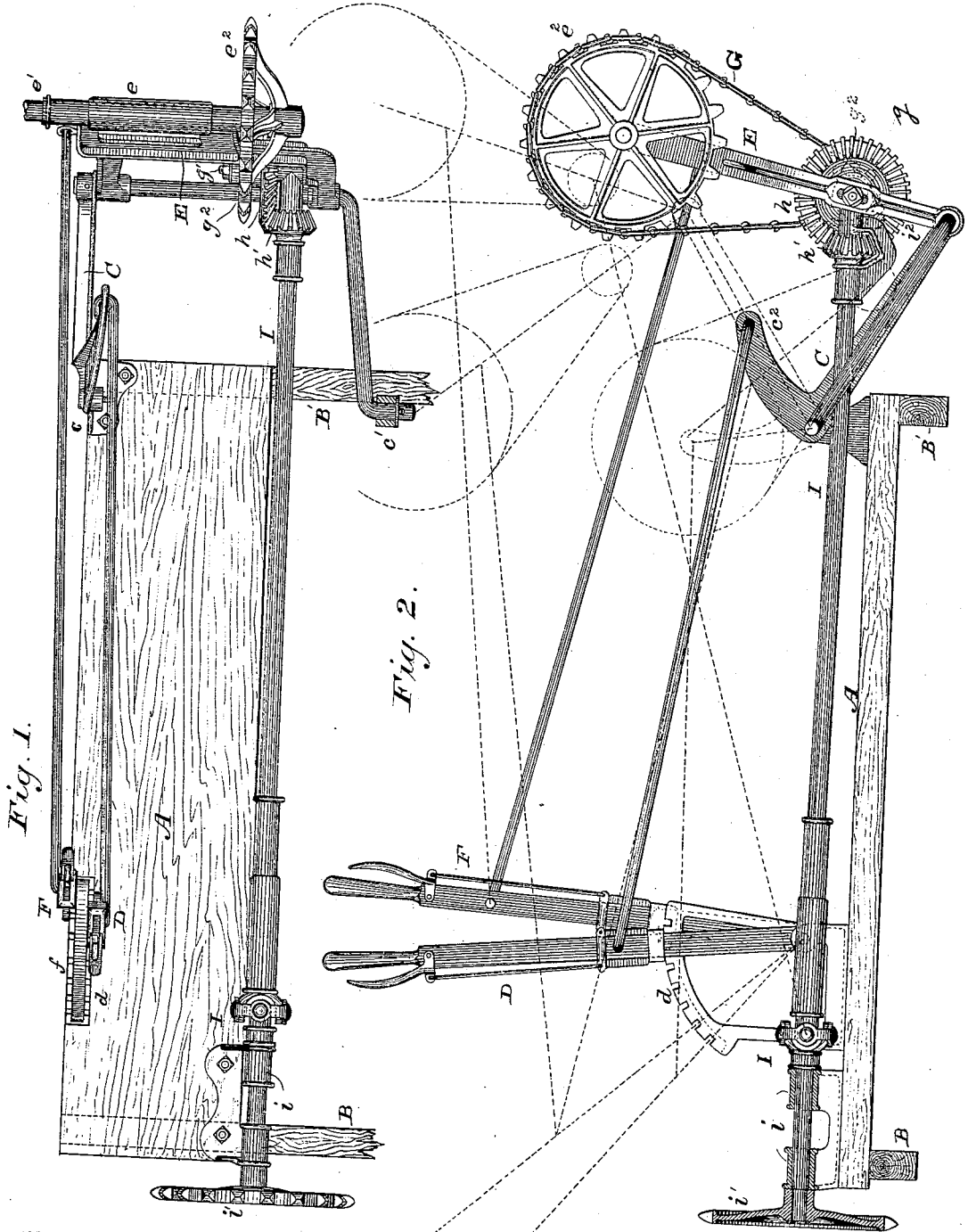
WITNESSES
Wm A. Skinkle
H. W. Elmore
INVENTOR
Henry E. Pridmore
By his Attorneys
Pomerison & Pomerison

UNITED STATES PATENT OFFICE.

HENRY E. PRIDMORE, OF CHICAGO, ILLINOIS, ASSIGNOR TO THE McCOR-
MICK HARVESTING MACHINE COMPANY, OF SAME PLACE.

HARVESTER-REEL.

SPECIFICATION forming part of Letters Patent No. 270,910, dated January 23, 1883.

Application filed August 16, 1882. (No model.)

*To all whom it may concern:*

Be it known that I, HENRY E. PRIDMORE, of Chicago, in the county of Cook and State of Illinois, have invented certain new and useful Improvements in Harvester-Reels, of which the following is a specification.

My invention relates primarily to that class of reels in which the reel-shaft is supported by double-hinged frames, each frame independently controlled by a separate lever, or by a compound-lever arrangement common to both, so that while one of said frames is set to a certain adjustment the other may be individually moved and locked to change the position of the reel in certain lines; and it consists in an improved mode of mounting and driving the reel in its immediate supporting-frame; in supporting the reel-shaft in bearings in the outer supporting frame and driving it by means of a sprocket-wheel fast to its end, connecting by chain with a sprocket-wheel or driver upon a counter-shaft carried in a slot or slots in said frame, so as to be adjustable toward and from the reel-shaft to fit or tighten the chain belt; in mounting the reel-shaft and its sprocket-wheel in bearings upon the outer supporting-frame; a counter-shaft in a slotted way or ways in said frame to permit adjustment to and from the reel-shaft, a sprocket-wheel upon said counter-shaft engaging with the chain belt from the reel-shaft; a bevel-wheel also upon said counter-shaft and fast to the sprocket-wheel, and an intermeshing bevel-pinion upon the end of a telescoping tumbling-shaft driven from the harvester, and coupled at its free end to the counter-shaft in such manner as to rise and fall with it in its adjustments, or in the movements of the reel-supporting frame to preserve the bevel-gearing in engagement; and in the various other combinations and details of construction, hereinafter pointed out.

In the drawings, Figure 1 is a plan view of so much of a harvester and reel-adjusting mechanism as is sufficient to a proper understanding of my invention; and Fig. 2 is a side elevation of the parts shown in Fig. 1, a portion being in section to show the manner of mounting the tumbling-shaft.

A is a foot board or plank, usually supported upon the inner or grain side of the elevator beneath the driver's seat, and sometimes bearing the seat-standards.

B B' are timbers or corbel-pieces projecting from the front and rear elevator-struts to carry said board or plank. The first or inner reel-frame, C, is pivoted in bracket-bearings $c$ $c'$, bolted respectively to the front end of the foot-board and the front corbel-piece, or it may be to standards at the front of the elevator-frame. Projecting from this primary reel-frame is an arm or crank, $c^2$, connected by a link with an adjusting-lever, D, which, by means of the usual dog and hand-piece, may be latched into any one of the interdental spaces of a segment-rack, $d$, near the rear end of the foot-board, and conveniently arranged with respect to the driver's seat. This lever and primary reel-frame give to the reel its up-and-down adjustment.

To the arms of the primary reel-frame is jointed the second or outer frame, E, having bearings $e$ for the reel-shaft $e'$, and connected by link with a second lever, F, which latches into a segment-rack, $f$, alongside the rack for lever D, and preferably cast in the same standard therewith. This latter lever and secondary frame control the in-and-out adjustment of the reel.

One arm of the secondary or outer frame is slotted longitudinally, as at $g$, for a little distance near the joint with the primary frame to receive the end of a short counter-shaft or spindle, $g'$, carrying a loose sprocket-wheel, $g^2$, and by means of clamping-nuts or other suitable device adjustable laterally along the slot to take up any slack in the chain belt G, by which said sprocket-wheel is connected with and drives an opposing sprocket-wheel, $e^2$, upon the reel-shaft to turn the reel.

Fast to the sprocket-wheel $g^2$ is a miter-gear, $h$, which meshes with and is driven by a miter-pinion, $h'$, upon the free end of a telescoping tumbling-shaft, I, extending rearwardly from this point along the plank or foot-board to bearings $i$ in a bracket bolted to said board, and beyond this fitted with a chain-wheel, $i'$, over which a driving-belt from the harvester-gearing will be thrown—as, for instance, the belt usual at the rear of Marsh harvesters— driven from the crank-shaft, and driving both platform and elevator-aprons.

The front or free end of the tumbling-shaft is coupled to the spindle $g'$ by means of a yoke-piece, $i^2$, having a transverse sleeve or bearing to take over said spindle, and two longitudinal bearings to receive said shaft and allow it to be collared therein against escape. Between these latter bearings is a downward bend to bridge the pinion $h'$, which is mounted upon the shaft between them. With this construction the pinion will be kept in mesh with its gear and drive it, notwithstanding any change in the position of the spindle to tighten the chain belt, and during all of the adjustments of the reel-supports.

I claim as my invention—

1. The combination of the double-jointed reel-supporting frames, means for controlling their position, the reel-shaft turning in bearings in the arms of the outer frame, the telescoping tumbling-shaft connected to the outer frame, adjacent to its joint with the inner, and a driving-connection between said shaft and the reel-shaft.

2. The combination of the double-jointed reel-supporting frames, means for controlling the position of said frames, the reel-shaft turning in bearings in the arms of the outer frame, a counter-shaft or spindle, also mounted in said outer frame, near the joint with the inner frame, a driving-connection between the reel-shaft and counter-shaft, and a driven telescoping tumbling-shaft yoked at its free end to the counter-shaft and gearing with it to drive it, and thereby the reel.

3. The combination of the reel-shaft turning in bearings in the arms of its hinged supporting-frame, a sprocket-wheel upon said shaft, a counter-shaft or spindle carried in a slotted way in said frame, and means whereby it may be adjusted along said way toward and from the reel-shaft, a driven sprocket-wheel carried by said counter-shaft or spindle, and a belt connecting the two sprocket-wheels.

4. The combination of the double-jointed reel-supporting frames, means for controlling said frames, the reel-shaft turning in bearings in the arms of the outer frame, and provided with a sprocket-wheel, a counter-shaft or spindle, also mounted in said outer frame, near the joint with the inner frame, a sprocket-wheel and miter-gear carried by said counter-shaft, a belt connecting the two sprocket-wheels, and a driven telescoping tumbling-shaft yoked at its free end to the counter-shaft, and carrying a miter-pinion which meshes with and drives the miter-gear upon the latter, and thereby the reel.

5. The combination of the double-jointed reel-supporting frames, means for their control, the reel-shaft and its sprocket-wheel mounted in bearings in the outer frame, a counter-shaft or spindle adjustable in a slotted way in said frame toward and from the reel-shaft, a sprocket-wheel upon said counter-shaft engaging with the chain belt from the reel-shaft, a miter or bevel gear, also upon said counter-shaft and fast to the sprocket-wheel, and an intermeshing miter-pinion upon the end of a telescoping tumbling-shaft coupled at its free end to the counter-shaft and driven from the harvester.

6. The combination of the adjustable supporting-frame, the reel-shaft and its sprocket-wheel, the counter-shaft, and the sprocket-wheel and bevel-gear thereon, the telescoping tumbling-shaft, the yoke sleeved to the counter-shaft, and provided with longitudinal bearings, in which the free end of the tumbling-shaft is collared, and the bevel-pinion mounted upon the tumbling-shaft, between said latter bearings in the yoke, and driving the gear, substantially as described.

7. The telescopic tumbling-shaft mounted in bearings upon the plank or foot-board inside of and over the elevator, provided at its rear end with a sprocket-wheel driven by the chain belt at the rear of the harvester, and running longitudinally over said plank to a connection with the gearing carried in the adjustable reel-supporting frame or frames, substantially as described.

HENRY E. PRIDMORE.

Witnesses:
JOHN V. A. HASBROOK,
WM. R. BAKER.